United States Patent [19]

Mutone

[11] Patent Number: 5,086,499
[45] Date of Patent: Feb. 4, 1992

[54] COMPUTER NETWORK FOR REAL TIME CONTROL WITH AUTOMATIC FAULT IDENTIFICATION AND BY-PASS

[75] Inventor: Gioacchino A. Mutone, Pittsburgh, Pa.

[73] Assignee: AEG Westinghouse Transportation Systems, Inc., Pittsburgh, Pa.

[21] Appl. No.: 356,546

[22] Filed: May 23, 1989

[51] Int. Cl.$^5$ .............................................. G06F 11/00
[52] U.S. Cl. ................................. 364/200; 364/228.5; 364/230 G; 364/238.2; 364/240.2; 364/240.4; 364/242 K; 364/260.1; 364/265.1; 364/266.0; 364/266.5; 371/8.1
[58] Field of Search ........................ 371/8.2, 9.1, 11.1, 371/11.2, 11.3, 68.1, 68.2, 68.3, 69.1; 364/200, 228.3, 268.3, 268, 240.2, 268.1, 229.4

[56] References Cited

U.S. PATENT DOCUMENTS

| | | | |
|---|---|---|---|
| 3,303,474 | 2/1967 | Moore et al. | 371/9.1 |
| 3,805,039 | 4/1974 | Stiffler | 371/9.1 |
| 4,012,717 | 3/1977 | Censier et al. | 371/9.1 |
| 4,032,757 | 6/1977 | Eccles | 371/9.1 |
| 4,096,989 | 6/1978 | Tawfik | 318/563 |
| 4,198,678 | 4/1980 | Maatje et al. | 371/9.1 |
| 4,377,000 | 3/1983 | Staab | 371/11.3 |
| 4,532,594 | 7/1985 | Hosaka et al. | 364/431.11 |
| 4,622,667 | 11/1986 | Yount | 371/9.1 |
| 4,641,517 | 2/1987 | Spock et al. | 364/431.02 |
| 4,716,531 | 12/1987 | Saunders et al. | 364/431.02 |
| 4,823,256 | 4/1989 | Bishop et al. | 371/9.1 |
| 4,916,704 | 4/1990 | Bruckert et al. | 371/9.1 |

FOREIGN PATENT DOCUMENTS 0008868 1/1982 Japan.

OTHER PUBLICATIONS

WPOF–Overview & Description S, Westinghouse.

*Primary Examiner*—Michael R. Fleming
*Assistant Examiner*—Robert S. Hauser
*Attorney, Agent, or Firm*—Spencer & Frank

[57] ABSTRACT

A computer network for real time control having redundant components for automated fault identification and automated bypass of identified faulty components. The system includes at least two main computers, each coupled to at least two independent parallel data channels. A plurality of satellite computer pairs are connected to these channels, each pair receiving information from a plurality of I/O racks which are connected to redundant sensors for detecting information and to redundant actuators for implementing system control. The main computers are continuously crosslinked and perform evaluation of their respective input and output streams comparing these streams for consistency between the main computers. In the event that an inconsistency is detected in the data streams, the system checks for faulty components to determine the origin of the inconsistency. The system utilizes an evaluation method whereby each main computer independently accesses each of the parallel data channels, satellite computers, I/O racks, sensors and actuators to locate inconsistencies in the data stream. The system then allows for operation with one of the redundant components while the identified defective redundant component is repaired or replaced.

11 Claims, 1 Drawing Sheet

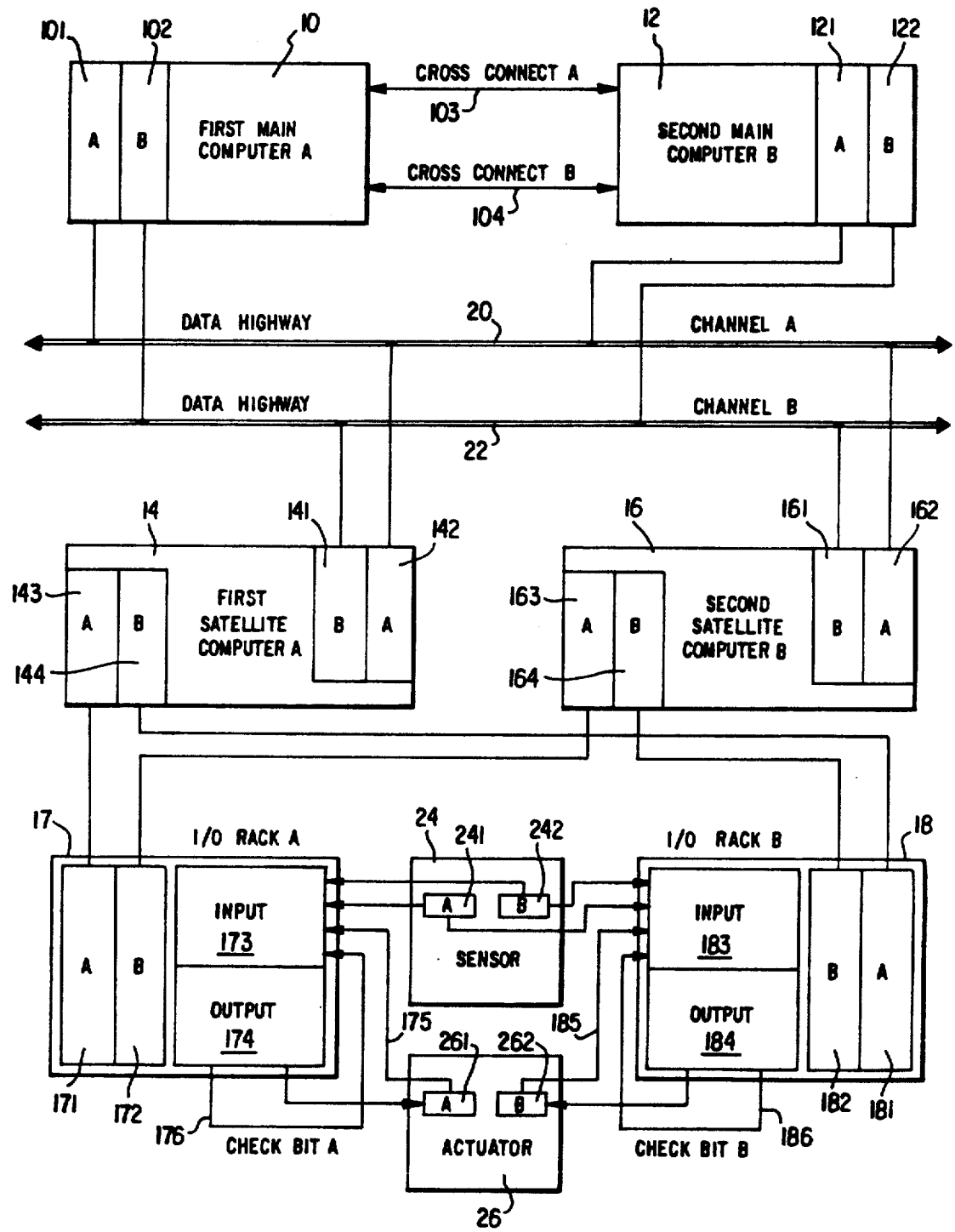

COMPUTER NETWORK FOR REAL TIME CONTROL WITH AUTOMATIC FAULT IDENTIFICATION AND BY-PASS

BACKGROUND OF THE INVENTION

The present invention relates to a computer system for performing real time control which has means for identifying faulty components within the system. More particularly, the present invention relates to such systems wherein a number of redundant information or data paths are provided to allow for accurate fault identification and to accommodate bypassing faulty components.

Computer systems are commonly utilized to control a wide variety of machinery, performing a wide variety of numerous complex tasks, processes or operations. In order for a computer system to properly accomplish a desired control function, it must rely upon a network to provide the necessary data to perform its controlling function. The network will most commonly consist of a number of sensors for detecting any of the variety of inputs, status or the like and any number of data busses or interfaces for communicating the sensed information to the computer system.

Control information is commonly sent back through the network in response to the sensed information for maintaining proper control of the desired operation. With a complex series of sensors, networks, busses, inputs/outputs and transferring devices, a failure can often arise in such a complex network. Therefore, provisions have to be made to account for errors or failures within the computer system or the information network. Failures must not only be detected and evaluated, but if possible, provisions must be made to circumvent errors or equipment failures in order to allow the system to perform its intended function with the remainder of the network and system in place.

SUMMARY OF THE INVENTION

It is an object of the present invention to provide a computer network capable of detecting and analyzing failures and to perform real time control despite the occurrence of such failures.

It is another object of the invention to provide a computer control system operating with a data carrying network which is capable of detecting failures within the network, double checking the existence of such failures and rerouting data or information through the network to circumvent failed portions.

These and further objects are accomplished by the present invention through the provision of a computer system and data transmittal network having redundancy, including two identical main computers each having independent interfaces to redundant data transmission pathways, two identical satellite computers having redundant interfaces to redundant data pathways and having redundant input/outputs for redundantly detecting and cross checking data, wherein the inputs and outputs of each satellite computer are compared to the inputs and outputs of the redundant identical satellite computer and both main computers independently compare the input/output data of each satellite computer at each redundant input and output sensor to check for correspondence.

BRIEF DESCRIPTION OF THE FIGURES

FIG. 1 is a schematic block diagram of the overall operating configuration of a two computer embodiment of the present invention.

DETAILED DESCRIPTION OF AN EXEMPLARY EMBODIMENT

FIG. 1 illustrates a redundant data network of the present invention utilized to perform real time control. Two parallel paths, designated A and B, are provided linking main computers 10 and 12 with sensor 24 and actuator 26. Main computer 10 utilizes data path A as its primary path, and B as a secondary or alternative path. Main computer 12 utilizes data path B as its primary path and path A as a secondary. The two identical main computers 10 and 12 each have independent interfaces 101, 102 and 121, 122, respectively. The primary interface 101 of computer lo, designated A, is connected to the first data highway 20 designated channel A. The primary interface 122 of computer 12, designated B, is connected to the second data highway 22, designated channel B. Each main computer 10, 12 has a secondary interface 102, 121 respectively which is connected to channel B or A respectively.

Satellite computers 14 and 16 are also provided. Each of the satellite computers has a B and A interface, 141, 142 and 161, 162, respectively, attached to the B and A data highways 22 and 20. Each satellite computer is connected to each of two identical input/output racks 17 and 18. First satellite computer 14 has rack interfaces 143 and 144 designated A and B, respectively. Second satellite computer 16 has rack interfaces 163 and 164, designated A and B, respectively.

These interfaces are interconnected to the first and second input/output (I/O) racks 17 and 18 as illustrated, with the A interfaces connected to I/O rack 17 and the B interfaces connected to I/O rack 18.

In the illustrated embodiment two main and two satellite computers are illustrated. In a computer network employing the present invention there are typically two main computers as illustrated, however, there are a number of satellite computer pairs. Each pair collecting data from sensors feeding those pairs through their I/O racks. Each satellite pair controlling a portion of the system through actuators. Each pair can be located within a few feet or several thousand feet from the main computers depending upon the extent of the data highway network.

As illustrated in FIG. 1, a sensor 24 and an actuator 26 are connected to the I/O racks 17 and 18. The sensor 24 along with all the other sensors of the network (not illustrated) gather data information from the process or device being monitored and controlled and feed information to the I/O racks 17 and 18. The actuator receives commands from I/O racks 17 and 18 and acts upon the device or system being controlled.

Sensor 24 is provided with redundant transducers 241 and 242 for supplying sensed information to I/O racks 17 and 18. Each transducer supplies information to both of the I/O racks. The I/O racks 17 and 18 are each provided with an input 173, 183, respectively for receipt of the information from the sensor.

The actuator 26 is provided with redundant transducers 261 and 262 which each receive commands from the output register 174 or 184 of one of the I/O rack 17 and 18, respectively. In this manner, the actuator 26 receives redundant commands, however, only one command is supplied to each of the redundant transducers 261, 262 of the actuator 26. The actuator 26 acts upon the information only when the commands received by each of the transducers 261 and 262 are in agreement. The command outputs from I/O racks 17 and 18 are looped back from the transducers 261 or 262, to the inputs 173 and 183, respectively, of the same I/O rack on lines 175 or 185, so that they can be monitored as any other input signal. Also, each I/O rack is provided with a means for generating a check bit which is also fed back along line 176 or 186 into the input of the same I/O rack. This check bit is utilized to evaluate error checking in the event of signal discontinuity, as will be explained in greater detail later.

In a normal mode of operation, both sides of a redundant system perform the identical control function by reading inputs from their respective sides of the sensor, performing the required logic calculations, and initiating commands. In this manner the first main A computer 10 works with the first satellite A computer 14 and the first I/O A rack 17 to receive data from sensor 24 and to control actuator 26. Simultaneously, the second main B computer 12, second satellite B computer 16 and second I/O B rack 18 act to receive data from sensor 24 and to control actuator 26 in parallel therewith. Each main computer utilizes the respective sets of interfaces and channels A, B respectively all the way down to the sensors and actuators to perform the respective control function.

The present invention teaches a method that utilizes the configuration illustrated in FIG. 1 to achieve fault redundant performance with automatic identification of the faulty component within the network or system. The network also achieves automatic bypassing of the faulty component by utilizing the parallel control channel with confidence.

Main computers 10 and 12 are provided with cross-connected links 103 and 104 for continuous monitoring of the input data received by both main computers to check for agreement of this data. Because the loop back along signal lines 175 and 185 of the output to activator 26 is provided as described above, the monitoring between main computers 10 and 12 can check both the input and output to the sensors and actuators, respectively, of both channels.

An essential element in achieving fault redundant performance is the provision in each of the main computers 10 and 12 of software which provides the following function. When a discrepancy is detected in any of the input data, both main computers 10 and 12 note the discrepancy (assuming both main computers are functioning properly). Main computer 10 if operating properly will undertake the initial corrective and diagnostic actions described below, with subsequent notification to second main computer 12. Main computer 12 will wait for a fixed predetermined amount of time to receive such notification. If notification is not received within that time period, then main computer 12 will assume that main computer 10 is not functioning properly and therefore second main computer 12 will undertake the corrective actions described below.

The following discussion refers to diagnostic and corrective action taken by first main computer 10. If, as described above, second main computer 12 is utilized then it will be understood that corresponding components of the B channel would be utilized where A channel components are referenced. Upon detection of a discrepancy in the input or output data from the cross-connect link, main computer 10 (or in the alternative second main computer 12) utilizes its own alternate interface 102 to the B channel 22 to read directly the redundant data input on data highway B which would normally be channelled to second main computer 12. If, as a result of this cross-check, the data set on channel B coincides with the data set on channel A, then the second main computer 12 or its linkage to data highway 22, channel B, is presumed defective either in the linking mechanism or in the interface 122. Communication to the other cross-connect link 104, B, is utilized to determine if a fault is in the primary, A, cross-connected channel 103. In either situation, operation can continue with both channels being read by one of the main computers 10 or 12 while the other main computer or the defective cross-connect link is serviced.

If the data from the cross-connect channel indicates that a discrepancy is still present when main computer 10 is reading the data off of both channel A 20 and B 22, then the problem is located either in the first main computer 10 itself or elsewhere within the system network. In order to determine where the problem exists, the first main computer 10 requests the second main computer 12 to read the redundant set of input data on the A channel. Second main computer 12 reads this data through secondary interface 121 and compares it to the data read from channel B on interface 122. If the data sets coincide, then the system fault is in the first main computer 10. Second main computer 12 will therefore be utilized to continue normal operation utilizing both channels A and B while first main computer 10 is serviced.

If, however, upon evaluation by second main computer B the data sets continue to demonstrate a discrepancy, trouble shooting control is resumed as described below by first main computer 10.

If, the cause of the discrepancy was not found through the procedure outlined above, main computer 10 begins a similar trouble shooting procedure that again utilizes the dual redundancy configuration to determine the location of the problem. However, in this error checking sequence, the next level of the system is evaluated, i.e., the satellite computer level. To accomplish this, both main computers 10 and 12 utilize the same satellite computer, either first satellite computer 14 or second satellite computer 16 to collect the input data. The data thus received by each of the main computers 10 and 12 is compared. Then the other satellite computer is utilized. In this manner, the correct operation of each of the satellite computers 14 and 16 can be determined. As detailed above, this procedure will determine which satellite is defective and operation can continue utilizing the other satellite computer while the defective one is serviced.

In a similar manner, the integrity of I/O racks 17 and 18 can be evaluated, switching between racks and comparing data. The network functions can be maintained while identification of a faulty I/O rack is made, and service to that rack is performed.

Through utilizing the procedure outlined above, and by applying this procedure to each level of the network, the systematic evaluation of network components can be accomplished throughout the entire network until the cause of a data fault is determined in any one of the components of the network, including the main computers, interfaces to the data highway, the satellite computers, interface to the I/O racks, the I/O racks or the sensors or actuators.

The check bit feature provided on each I/O rack connecting the output to the input of the same rack, is utilized at any time a comparison of input data changes from unsatisfactory to satisfactory. The redundancy check bit is utilized to insure that the newly obtained coincidence of input data does not reflect a common failure but instead reflects satisfactory data.

For example, in a situation wherein both main computers 10 and 12 switch to obtaining their data through first satellite computer 14, during an error checking sequence described above, the data requires verification. If the data from each channel passed through satellite computer 14 coincides, it could be the result of a common mode failure within satellite computer 14 that effects both channels A and B. In this case, the check bit on each I/O rack is toggled according to a randomly generated sequence. The reception of an identical sequence on the respective input channel is an indication that the coincidence is not due to a common mode failure.

It will be understood that the above description of the present invention is susceptible to various modifications, changes and adaptations, and the same are intended to be comprehended within the meaning and range of equivalents of the appended claims.

What is claimed is:

1. A computer system comprising:
    first and second main computers, each computer having a primary data interface and a secondary data interface each interface for sending and receiving system signals including sensor system signals and actuator system signals;
    a first data highway for conveying said system signals, connected to said primary data interface of said first main computer and to said secondary data interface of said second main computer;
    a second data highway for conveying said system signals, connected to said primary data interface of said second main computer and to said secondary data interface of said first main computer;
    first and second satellite computers for relaying said system signals, each connected to said first and second data highways;
    first and second I/O racks, each connected to said first and second satellite computers;
    a sensor pair for generating said sensor system signals, connected to each of said I/O racks, and
    an actuator pair, connected respectively to each of said I/O racks and having means for comparing said actuator system signals, for reacting to system signals which are in agreement with each other.

2. The computer system of claim 1, wherein said first main computer comprises first comparing and detecting means, coupled to said second main computer, for comparing said system signals received by said first main computer with said system signals received by said second main computer, and for detecting discrepancies between said system signals received by said first main computer and said system signals received by said second main computer; and
    said second main computer comprises second comparing and detecting means, coupled to said first main computer, for comparing said system signals received by said first main computer with said system signals received by said second main computer, and for detecting discrepancies between said system signals received by said first main computer and said system signals received by said second main computer.

3. A method for diagnosis of a computer system according to claim 2, comprising the steps of:
    detecting discrepancies between said system signals received by said first main computer and said system signals received by said second main computer;
    monitoring said primary data interface and said secondary data interface of said first main computer and comparing the system signals received thereon for consistency;
    utilizing said first satellite computer to relay said system signals between said first I/O rack and said first and second data highways;
    utilizing said first I/O rack to establish a data path between said sensor pair and said first and second satellite computers.

4. The computer system of claim 1, wherein said first main computer further comprises first monitoring means, coupled to said primary data interface and said secondary data interface of said first main computer, for selectively monitoring either said primary data interface or said secondary data interface of said first main computer; and
    said second main computer further comprises second monitoring means, coupled to said primary data interface and said secondary data interface of said second main computer, for selectively monitoring either said primary data interface or said secondary data interface of said second main computer.

5. The computer system of claim 4, wherein said first main computer further comprises first comparing and detecting means, coupled to said first monitoring means and connected to said second main computer, for comparing said system signals received by said first main computer with said system signals received by said second main computer, and for detecting discrepancies between said system signals, and wherein
    said second main computer further comprises second comparing and detecting means, coupled to said second monitoring means and connected to said first computer, for comparing said system signals received by said first main computer with said system signals received by said second main computer, and for detecting discrepancies between said system signals received by said first main computer with said system signals received by said second main computer, wherein said first monitoring means and said second monitoring means are responsive to said first comparing and detecting means and said second comparing and detecting means, respectively, to configure said first and second main computers to simultaneously monitoring of one of said first and second data highways.

6. The computer system of claim 1, further comprising:
    first satellite enabling means, coupled to said first main computer and said second main computer and connected to said first satellite computer, for selectively enabling said first satellite computer to relay said system signals to said first and second data highways; and
    second satellite disabling means, coupled to said first main computer and said second main computer and connected to said second satellite computer, for selectively disenabling said second satellite computer from relaying said system signals while said first satellite enabling means selectively enables said first satellite computer to relay said system signals to said first and second data highways.

7. The computer system of claim 1, further comprising:
second satellite enabling means, coupled to said first main computer and said second main computer and connected to said first satellite computer, for selectively enabling said second satellite computer to relay said system signals to said first and second data highways; and
first satellite disabling means, coupled to said first main computer and said second main computer and connected to said first satellite computer, for selectively disabling said first satellite computer from relaying said system signals while said second satellite enabling means selectively enables said second satellite computer to relay said system signals to said first and second data highways.

8. The computer system of claim 1, further comprising:
first signal path establishing means, coupled to said first main computer and said second main computer and connected to said first I/O rack, for establishing a signal path between said sensor pair and said first and second satellite computers via said first I/O rack; and
second signal path blocking means, coupled to said first main computer and said second main computer and connected to said second I/O rack, for blocking a signal path between said sensor pair and said first and second satellite computers via said second I/O rack while said first signal path establishing means establishes said path between said sensor pair and said first and second satellite computers.

9. The computer system of claim 1, further comprising:
second signal path establishing means, coupled to said first main computer and said second main computer and connected to said first I/O rack, for establishing a signal path between said sensor pair and said first and second satellite computers via said second I/O rack; and
first signal path blocking means, coupled to said first main computer and said second main computer and connected to said first I/O rack, for blocking a signal path between said sensor pair and said first and second satellite computers via said first I/O rack while said first signal path establishing means establishes said path between said sensor pair and said first and second satellite computers.

10. A method for monitoring and controlling sensors and actuators, comprising the steps of:
providing first and second main computers;
providing a first signal pathway divided into a plurality of first discrete coupling segments for coupling said first main computer with sensors and a first actuator and for coupling said second main computer with said sensors and said first actuator;
providing a second signal pathway divided into a plurality of second discrete coupling segments for coupling said first main computer with said sensors and a second actuator and for coupling said second main computer with said sensors and said second actuator, said second signal pathway being redundant and parallel to said first signal pathway and said plurality of second discrete coupling segments corresponding to said plurality of first discrete coupling segments;
selectively monitoring and controlling said sensors and said first actuator with said first main computer via said first signal pathway;
selectively monitoring and controlling said sensors and said second actuator with said second main computer via said second signal pathway;
comparing during said monitoring by said first computer and said monitoring by said second computer system signals at points in said plurality of first discrete coupling segments and points in said plurality of secondary discrete coupling segments corresponding to said plurality of first discrete coupling segments and generating a discrepancy signal whenever said comparing step determines that there is a discrepancy between said system signals.

11. A method according to claim 10, wherein said step of selectively monitoring with said first computer includes the step of:
selectively bypassing in response to said discrepancy signal, at least one of said plurality of first discrete coupling segments of said first signal pathway, and substituting therefor one of said plurality of second discrete coupling segments of said second signal pathway corresponding to said at least one of said plurality of first discrete coupling segments.

* * * * *